United States Patent
Akutsu et al.

(10) Patent No.: US 7,604,758 B2
(45) Date of Patent: Oct. 20, 2009

(54) PROCESS FOR PRODUCING POLYMER OPTICAL WAVEGUIDE

(75) Inventors: Eiichi Akutsu, Ashigarakami-gun (JP); Shigemi Ohtsu, Ashigarakami-gun (JP); Keishi Shimizu, Ashigarakami-gun (JP); Kazutoshi Yatsuda, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 805 days.

(21) Appl. No.: 10/868,859

(22) Filed: Jun. 17, 2004

(65) Prior Publication Data

US 2005/0133943 A1   Jun. 23, 2005

(30) Foreign Application Priority Data

Dec. 19, 2003 (JP) ............... 2003-422136

(51) Int. Cl.
*G02B 6/00* (2006.01)
*B29D 11/00* (2006.01)
*B29C 33/40* (2006.01)
*G02B 6/10* (2006.01)

(52) U.S. Cl. ............... 264/1.24; 264/2.5; 264/220; 264/225; 264/227; 264/313; 977/877

(58) Field of Classification Search ............... 264/1.28, 264/1.24, 220, 225, 227, 313, 2.5; 977/887
See application file for complete search history.

(56) References Cited

U.S. PATENT DOCUMENTS

| | | | | |
|---|---|---|---|---|
| 4,781,870 A | * | 11/1988 | Talbert | 264/1.9 |
| 4,957,663 A | * | 9/1990 | Zwiers et al. | 264/1.38 |
| 5,512,131 A | * | 4/1996 | Kumar et al. | 438/738 |
| 5,716,556 A | * | 2/1998 | Heard | 264/1.24 |
| 6,355,198 B1 | * | 3/2002 | Kim et al. | 264/259 |
| 6,500,603 B1 | | 12/2002 | Shioda et al. | |
| 6,901,198 B2 | * | 5/2005 | Shimizu et al. | 385/129 |

(Continued)

FOREIGN PATENT DOCUMENTS

JP     A-61-138903     6/1986

(Continued)

OTHER PUBLICATIONS

Younan Xia et al.; "Soft Lithography"; *Annu. Rev. Mater. Sci.*; vol. 28; pp. 153-184.

(Continued)

*Primary Examiner*—Monica A Huson
*Assistant Examiner*—Michael T Piery
(74) *Attorney, Agent, or Firm*—Oliff & Berridge, PLC

(57) ABSTRACT

A process for producing a polymer optical waveguide including:
1) preparing a rubber mold having a composite layer structure in which a rubber layer which has a concave portion corresponding to an optical waveguide core and contains a rubber mold-forming curable resin is buried in a rubber layer-forming concave portion of a rigid substrate having the rubber layer-forming concave portion;
2) bringing a cladding substrate into close contact with the rubber mold;
3) filling the concave portion of the rubber mold, with which the cladding substrate has been brought into close contact, with a core-forming curable resin;
4) curing the filled core-forming curable resin;
5) removing the rubber mold from the cladding substrate; and
6) forming a cladding layer on the cladding substrate on which the core has been formed.

23 Claims, 8 Drawing Sheets

U.S. PATENT DOCUMENTS

| | | | |
|---|---|---|---|
| 7,174,057 B2 * | 2/2007 | Shimizu et al. | 385/1 |
| 2004/0081416 A1 * | 4/2004 | Akutsu et al. | 385/129 |
| 2004/0245660 A1 * | 12/2004 | Ohtsu et al. | 264/1.27 |
| 2005/0158003 A1 * | 7/2005 | Ohtsu et al. | 385/129 |

FOREIGN PATENT DOCUMENTS

| | | |
|---|---|---|
| JP | A-10-90544 | 4/1989 |
| JP | A-2-131202 | 5/1990 |
| JP | A-02-155704 | 6/1990 |
| JP | A-06-114845 | 4/1994 |
| JP | A-06-304933 | 11/1994 |
| JP | A-08-507800 | 8/1996 |
| JP | A-8-271746 | 10/1996 |
| JP | A-09-269429 | 10/1997 |
| JP | A-10-090532 | 4/1998 |
| JP | A-10-130323 | 5/1998 |
| JP | A-11-003545 | 1/1999 |
| JP | A 2000-39530 | 2/2000 |
| JP | A 2000-39531 | 2/2000 |
| JP | A 200-235127 | 8/2000 |
| JP | A-2001-027714 | 1/2001 |
| JP | B2 3151364 | 1/2001 |
| JP | A-2001-269958 | 10/2001 |
| JP | A-2002-086462 | 3/2002 |
| JP | A-2002-086515 | 3/2002 |
| JP | A-2002-088120 | 3/2002 |
| JP | A-2002-090565 | 3/2002 |
| JP | A-2002-267859 | 9/2002 |
| JP | A-2002-284812 | 10/2002 |
| JP | A 2004-29507 | 1/2004 |
| JP | A 2004-86144 | 3/2004 |

OTHER PUBLICATIONS

Michel, B. "Printing meets Litography: Soft approaches to high-resolution patterning." *IBM J. Res. & Dev.* vol. 45 No. 5 Sep. 5, 2001 pp. 697-719.

Whitesides, George M. et al. "The Art of Building Small." *Scientific American* pp. 39-47 Sep. 2001.

Advanced Materials. vol. 8, No. 5, p. 420-424.

Journal of Applied Polymer Science. vol. 84, No. 9, p. 1657-1668.

"Function and Materials." Yoshiharu Wada. vol. 20, No. 8, p. 16-22.

"Chemistry and Economy." Hironobu Shinohara. vol. 44, No. 14, p. 74-82.

"Function and Materials." Hironobu Shinohara. vol. 13, No. 1, p. 40-52.

* cited by examiner

US 7,604,758 B2

PROCESS FOR PRODUCING POLYMER OPTICAL WAVEGUIDE

This application claims priority under 35 USC 119 from Japanese Patent Application No. 2003-422136, the disclosure of which is incorporated by reference herein.

BACKGROUND OF THE INVENTION

1. Field of the Invention

The present invention relates to a process for producing a polymer optical waveguide, and particularly, to a process for producing a polymer optical waveguide by which a polymer optical waveguide can be formed on an embedded silicon substrate or an electric circuit substrate.

2. Description of the Related Art

As a process for producing a polymer optical waveguide, the following processes are suggested: (1) a process of impregnating a film with a monomer, selectively exposing a core portion to light to change a refraction index thereof, and sticking a film thereto (selective polymerization); (2) a process of applying a core layer and a clad layer to a substrate, and forming a clad portion by reactive ion etching (RIE); (3) a process using photolithography, in which an ultraviolet ray-curable resin obtained by adding a photosensitive material to a polymer is imagewise exposed to light and developed (direct exposure); (4) an injection molding process and; (5) a process of applying a core layer and a clad layer to a substrate, and exposing a core portion to light to change a refraction index of the core portion (photo bleaching).

However, the selective polymerization process (1) has a problem with regard to the sticking of the film, and the processes (2) and (3) result in an increase in costs since photolithography is used. The process (4) has a problem with regard to precision of the resultant core diameter, and the process (5) cannot provide a sufficient refraction index difference between the core layer and the clad layer.

At present, practical processes which have superior performance include only the processes (2) and (3). However, these processes also have a problem with regard to costs as described above. Additionally, none of the processes (1) to (5) can be applied to the formation of a polymer optical waveguide on a flexible plastic substrate having a large area.

A process of filling a pattern substrate (clad) in which a pattern of grooves, which are to serve capillaries, is formed with a polymer precursor material for a core, curing the precursor material to form a core layer, and then bonding a flat substrate (clad) onto the core layer is known as a process for producing a polymer optical waveguide. However, in this process, not only the capillary grooves but also the entirety of the narrow space between the pattern substrate and the flat substrate is filled with the polymer precursor material, and, when the polymer precursor material is cured, a thin layer having the same composition as the core layer is formed between the pattern substrate and the flat substrate. Therefore, light leaks out through this thin layer.

As one method of solving this problem, David Heard suggests a method of fixing a pattern substrate in which a pattern of grooves, which are to serve as capillaries, is formed to a flat substrate with a clamping member, sealing a contacting portion between the pattern substrate and the flat substrate with a resin, and then reducing an internal pressure to fill the capillaries with a monomer (diallyl isophthalate) solution, thereby producing a polymer optical waveguide (Japanese Patent Gazette No. 3151364).

This method uses the monomer as the core forming resin material instead of using a polymer precursor material to reduce a viscosity of the filling material and fill the capillaries with the filling material using capillarity, so that no other space than the capillaries is filled with the monomer.

However, because of the use of the monomer as the core forming material in this method, a volume shrinkage ratio of the monomer is large when the monomer is polymerized. Consequently, transmission loss of the polymer optical waveguide becomes large.

This method is also a complicated method, in which the pattern substrate and the flat substrate are fixed to each other with the clamp, and the contacting portion is sealed with the resin. Thus, this method is not suitable for mass production. As a result, a reduction in costs cannot be expected. Moreover, this method cannot be applied to the production of a polymer optical waveguide using, as a clad, a film having a thickness on the order of several millimeters or a thickness of 1 mm or less.

Recently, George M. Whitesides et al. at Harvard University have suggested, as a method for forming a nanostructure and as a soft lithographic process, a method called capillary micromolding. This is a method of using photolithography to form a master substrate, making use of adhesiveness of polydimethylsiloxane (PDMS) and an easily-peelable property thereof to transfer the nanostructure of the master substrate onto a mold made of PDMS, pouring a liquid polymer into this mold by capillarity, and curing the polymer. A detailed description thereof appears in *SCIENTIFIC AMERICAN* September 2001 (Nikkei Science, 2001, December).

Moreover, a patent for the capillary micromolding method was granted to Kim Enoch et al. of George M. Whitesides' group at Harvard University (U.S. Pat. No. 6,355,198).

However, even if the production process described in this patent is applied to the production of a polymer optical waveguide, it takes much time to form a core portion thereof since a sectional area of the core portion of the optical waveguide is small. Thus, the process is unsuitable for mass production. This process also has a drawback in that when a monomer solution is polymerized, a volume change is caused, so that a shape of the core is also changed, and consequently transmission loss becomes large.

B. Michel et al. of IBM Zurich Laboratory suggest a lithographic technique exhibiting a high resolution by the use of PDMS, and report that this technique provides a resolution on the order of several tens of nanometers. A detailed description thereof appears in IBM J. RES. & DEV. VOL. 45 NO. 5 September 2001.

As described above, the soft lithographic technique using PDMS and the capillary micromolding method are techniques which have been recently drawing attention as nanotechnologies, primarily in the U.S.A., but elsewhere as well.

However, when an optical waveguide is formed by a micromolding method as described above, reduction of the volume shrinkage ratio of a polymer (so that transmission loss is reduced) when the polymer is cured is incompatible with reduction of the viscosity of a filling liquid (the monomer and so forth) in order to attain easy filling. Accordingly, in a case where reduction of transmission loss is preferentially considered, the viscosity of the filling liquid cannot be lowered sufficiently and a filling speed becomes slow. Thus, the mass production of optical waveguides by this method cannot be expected. The micromolding method is carried out on the assumption that a glass or silicon plate is used as a substrate. Thus, use of a flexible film substrate in this method has not been considered in this method.

Under these circumstances, the inventors have already proposed a process for forming a polymer optical waveguide on a flexible film substrate by combining the film substrate with a cladding substrate (Japanese Patent Application Laid-Open (JP-A) No. 2004-086144). A flexible polymer optical waveguide which could not be conventionally produced can be accurately produced at reduced cost by this process for producing the polymer optical waveguide.

Attention has been focused on forming optical interconnections in place of metal wiring between equipment devices, between boards in an equipment device, and within a chip so as to suppress signal delay and control noise, and to improve integration in IC technology and LSI technology. For instance, a light emitting element is connected to a light receiving element by an optical waveguide (For instance, see JP-A Nos. 2000-39530, 2000-39531, and 2000-235127).

An optical interconnection element described in JP-A No. 2000-39530 has an incidence side mirror for making light from a light emitting element incident to a core, and an outgoing side mirror for irradiating light from the core to a light receiving element. In addition, a cladding layer is formed in a concave shape at a part corresponding to an optical passage from the light emitting element to the incidence side mirror and from the outgoing side mirror to the light receiving element, and the light from the light emitting element and the light from the outgoing side mirror are converged. In an optical interconnection element described in JP-A No. 2000-39531, a light-incident end face of a core is formed in a convex shape toward a light emitting element, and light from the light emitting element is converged to suppress wave guiding loss. Optical interconnection elements described in JP-A Nos. 2000-39530 and 2000-39531 have a complex structure, and therefore, extremely complicated processes are required for producing the optical interconnection elements.

In addition, an opto-electronic integrated circuit is described in JP-A No. 2000-235127. In the opto-electronic integrated circuit, a polymer optical waveguide circuit is directly assembled on an opto-electronic circuit substrate in which an electron element and an optical element are integrated. However, a photolithography method with a high cost is used for producing the polymer optical waveguide. Therefore, the opto-electronic integrated circuit also inevitably also becomes expensive.

To solve these problems, the inventors proposed an optical element described in JP-A No. 2004-029507. In the optical element, a light emitting part, or a light emitting part and a light receiving part is directly provided on a core end face of a polymer optical waveguide, and an optical element having no complex structure can be produced at low-cost by an extremely simplified method.

When an optical element described in JP-A No. 2004-029507 is assembled, it is preferable that a conductive circuit for an electric signal and a power supply to a light receiving element and/or a light emitting element is provided on a polymer optical waveguide described in JP-A No. 2004-086144.

SUMMARY OF THE INVENTION

The present invention has been made in view of the above circumstances and provides a process for producing a polymer optical waveguide in which a polymer optical waveguide with a high precision can be simply produced on a substrate.

One aspect of the invention is to provide a process for producing a polymer optical waveguide including: 1) preparing a rubber mold having a composite layer structure in which a rubber layer which has a concave portion corresponding to an optical waveguide core and contains a rubber mold-forming curable resin is buried in a rubber layer-forming concave portion of a rigid substrate having the rubber layer-forming concave portion; 2) bringing a cladding substrate into close contact with the rubber mold; 3) filling the concave portion of the rubber mold, with which the cladding substrate has been brought into close contact, with a core-forming curable resin; 4) curing the filled core-forming curable resin; 5) removing the rubber mold from the cladding substrate; and 6) forming a cladding layer on the cladding substrate on which the core has been formed.

BRIEF DESCRIPTION OF THE DRAWINGS

Preferred embodiments of the present invention will be described in detail based on the following figures, wherein.

DETAILED DESCRIPTION OF THE INVENTION

A process for producing a polymer optical waveguide of the invention includes the following processes of (1) to (6).

1) preparing a rubber mold having a composite layer structure in which a rubber layer which has a concave portion corresponding to an optical waveguide core and contains a rubber mold-forming curable resin is buried in a rubber layer-forming concave portion of a rigid substrate having the rubber layer-forming concave portion;

2) bringing a cladding substrate into close contact with the rubber mold;

3) filling the concave portion of the rubber mold, with which the cladding substrate has been brought into close contact, with a core-forming curable resin;

4) curing the filled core-forming curable resin;

5) removing the rubber mold from the cladding substrate; and 6) forming a cladding layer on the cladding substrate on which the core has been formed.

An aspect of a process for producing a polymer optical waveguide of the invention will be firstly described with reference to FIGS. 1 and 2. FIGS. 1A to 1G are conceptual views illustrating each process in the process for producing of the invention, and FIG. 2 is a perspective view illustrating the state (a process shown in FIG. 1D) that a cladding substrate which is one size larger than the rubber mold is brought into close contact with a rubber mold.

Figure 1A:
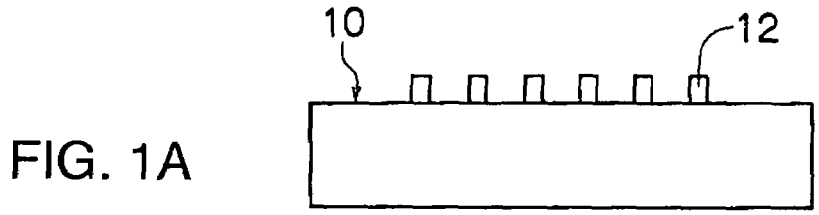
FIGS. 1A to 1G are conceptual views illustrating an aspect of a process for producing a polymer optical waveguide of the invention.
Figure 1B:
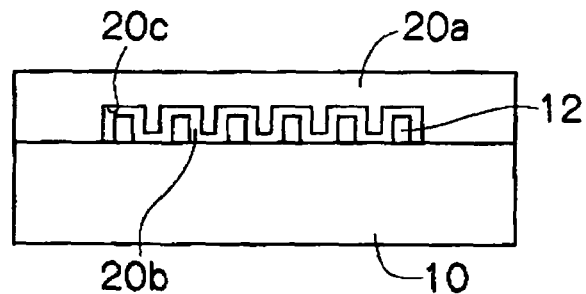
Figure 1C:
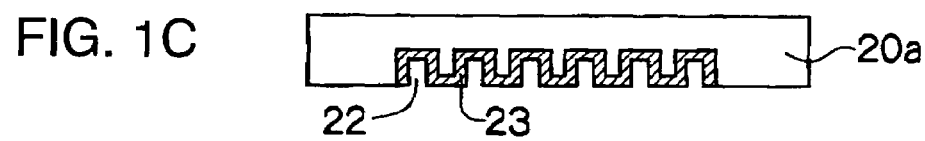

FIGS. 1A to 1C are conceptual views illustrating a process in which a rubber mold is produced by using a core master template 10 on which a convex portion 12 corresponding to an polymer optical waveguide core is formed. FIGS. 1D to 1G are conceptual views illustrating a process in which the polymer optical waveguide core is produced by using the rubber mold produced.

FIG. 1A illustrates a sectional view of the core master template 10 on which the convex portion 12 corresponding to the optical waveguide core is formed perpendicularly cut along the longitudinal direction of the convex portion 12.

FIG. 1B is a view illustrating the state that a rubber layer-forming concave portion 20b of a rigid substrate 20a is brought into close contact with the surface on which the convex portion 12 of the core master template 10 is formed. The groove depth and width of the rubber layer-forming concave portion 20b are larger than those of the convex portion 12 of the core master template 10. The rubber layer-forming concave portion 20b has a shape that is approximately similar to that of the convex portion 12, and contains groove parts 20c of the same number as the convex portion 12. Each convex portion 12 of the core master template 10 is enclosed by each groove part 20c. Space exists between the convex portion 12 of the core master template 10 and the rubber layer-forming concave portion 20b of the rigid substrate 20a as shown in FIG. 1B.

The space is filled with the rubber mold-forming curable resin, and the resin is cured to form a rubber layer. The rigid substrate 20a is removed from the master template 10 with the rigid substrate 20a and the rubber layer 23 combined. An introducing part 22a (see FIG. 2) for filling the concave portion 22 with core-forming curable resin and an exhaust part 22b (see FIG. 2) for exhausting the resin from the concave portion 22 corresponding to the convex portion 12 are formed by cutting both ends of the mold so as to expose the concave portion 22, and thereby a rubber mold 23 is prepared (see FIG. 1C).

Figure 1D:
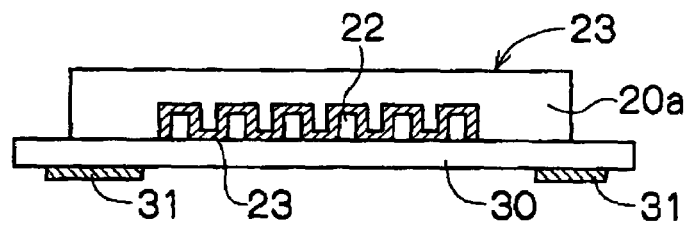
Figure 1E:
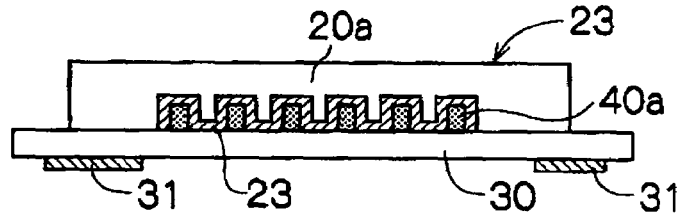
Figure 2:
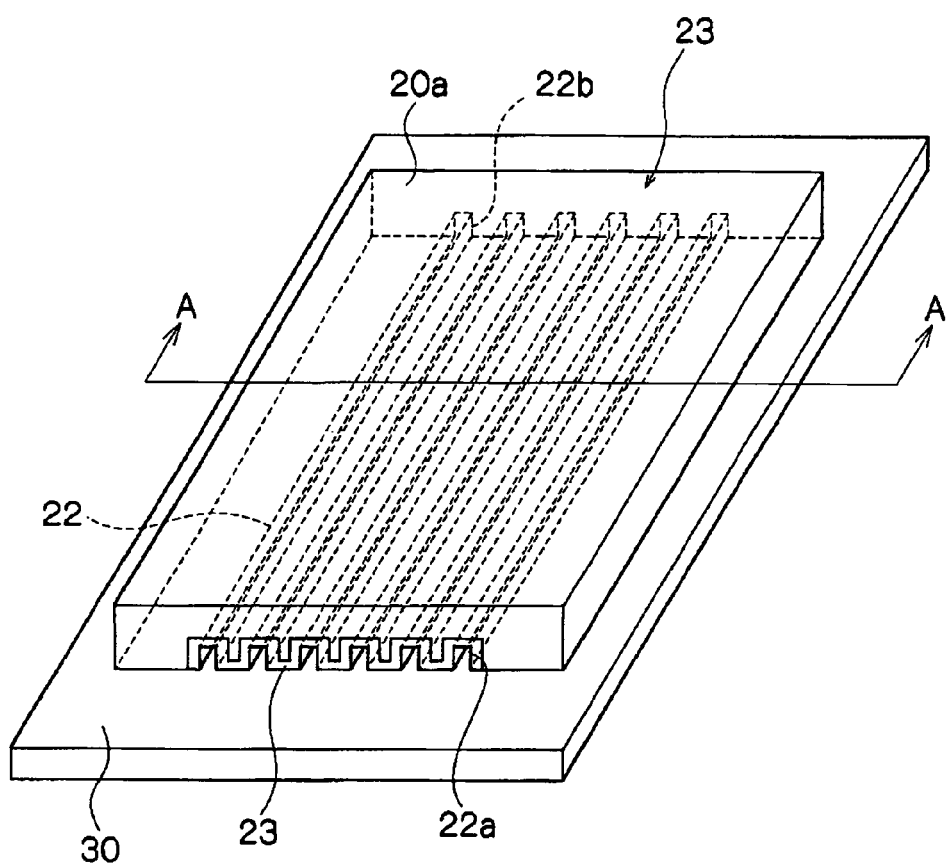
FIG. 2 is a perspective view illustrating the state that a cladding substrate is brought into close contact with a mold.

The thus-formed rubber mold 23 is brought into close contact with a cladding substrate 30 on which an electroconductive pattern 31 which is one size larger than the rubber mold 23 is formed (see FIG. 1D and FIG. 2). FIG. 1D illustrates a sectional view perpendicularly cut along longitudinal direction of the concave portion with a cladding substrate 30 brought into close contact with a rubber mold 23 (A-A cross section in FIG. 2). Next, several droplets of the core-forming curable resin 40a are supplied into the introducing part 22a of the rubber mold 23, and the concave portion 22 of the rubber mold 23 is filled with the resin by capillarity. The core-forming curable resin is exhausted from the exhaust part 22b formed on the other end part of the concave portion 22 (not shown). FIG. 1E illustrates a sectional view of a concave portion 22 of a rubber mold 23 which is filled with a curable resin perpendicularly cut along longitudinal direction of the concave portion.

Figure 1F:
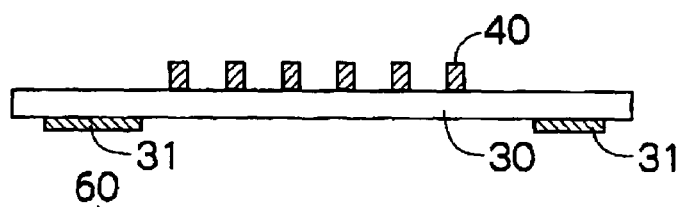

Then, the core-forming curable resin existing in the concave portion 22 of the rubber mold 23 is cured, and the rubber mold 23 is removed. FIG. 1F illustrates a sectional view of a cladding substrate 30 on which an optical waveguide core 40 is formed and which is perpendicularly cut along longitudinal direction of the core.

Figure 1G:
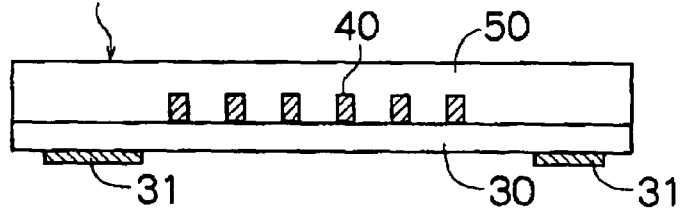

In addition, a polymer optical waveguide 60 is prepared by forming a cladding layer 50 as a cured layer of the core-forming curable resin on the core-forming surface of the cladding substrate 30. FIG. 1G illustrates a sectional view of the polymer optical waveguide 60 perpendicularly cut along the longitudinal direction of the core.

An example in which a reinforced member for reinforcing the rigid substrate of the rubber mold is provided and a cladding layer 32 is formed on the side forming an optical waveguide core of the cladding substrate 30 will be described below. FIGS. 3A to 3G are common with the processes shown in FIGS. 1A to 1G (In FIG. 3A, the rigid substrate or the like is brought into close contact with the core master template.). The process from the formation of the core master template 10 (omission) to the formation of the optical waveguide core 60 on the cladding substrate 30 on which the cladding layer is formed is shown.

Figure 3A:
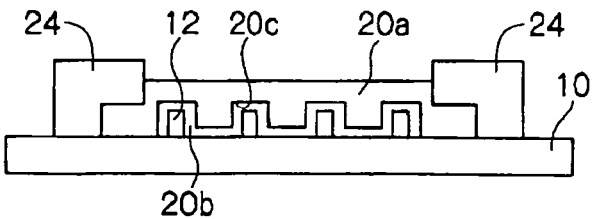
FIGS. 3A to 3G are conceptual views illustrating another aspect of a process for producing a polymer optical waveguide of the invention.
Figure 3B:
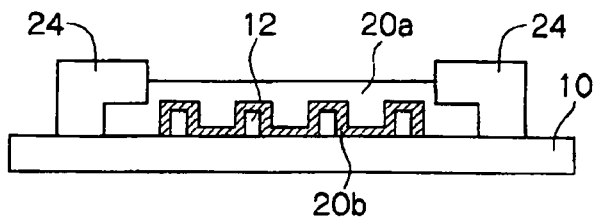
Figure 3C:
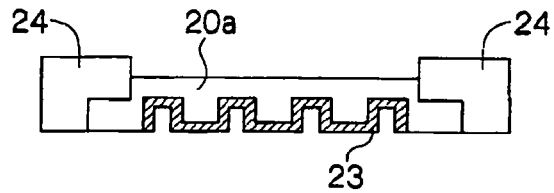
Figure 3D:
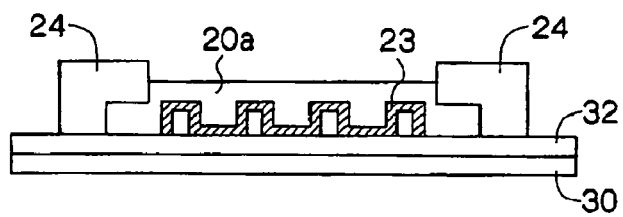
Figure 3E:
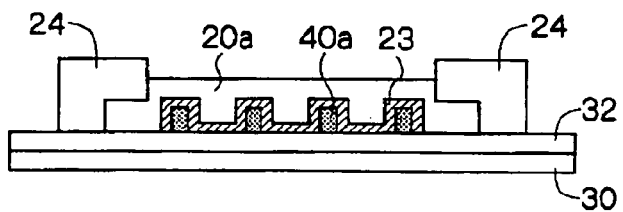
Figure 3F:
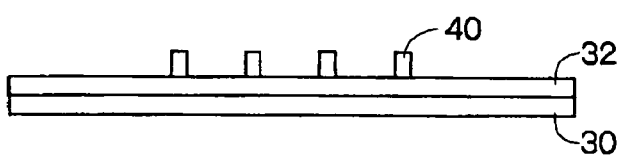
Figure 3G:
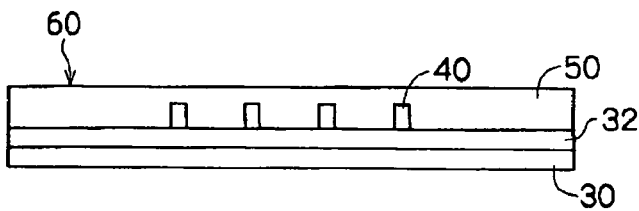
Figure 4A:
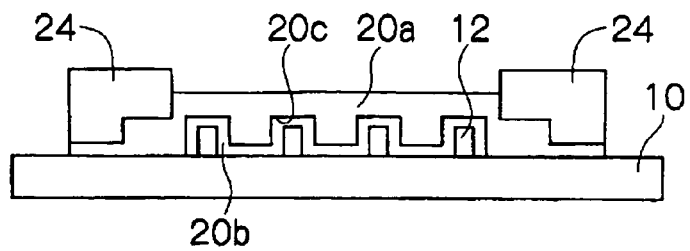
FIGS. 4A to 4F are conceptual views illustrating another aspect of a process for producing a polymer optical waveguide of the invention.
Figure 4B:
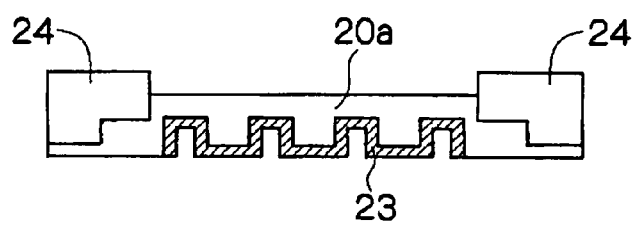
Figure 4C:
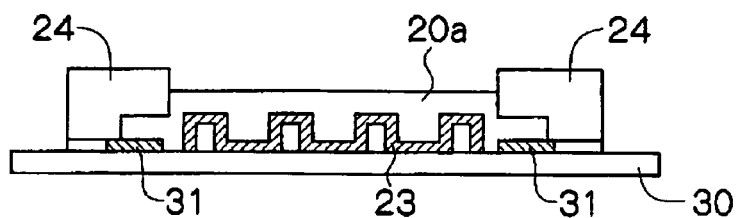
Figure 4D:
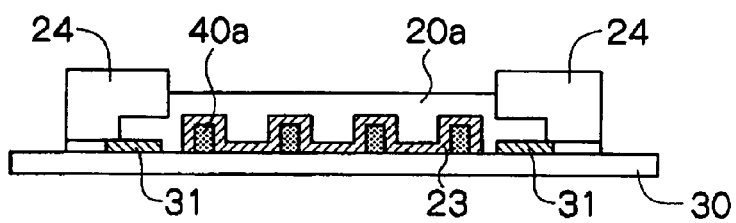
Figure 4E:
Figure 4F:
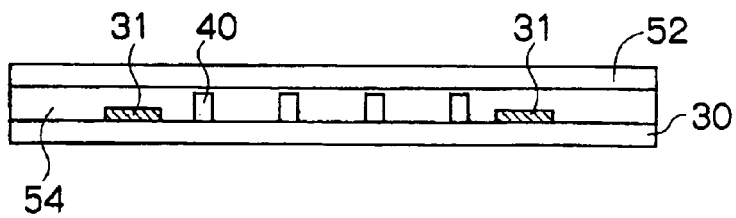

FIG. 4 shows an example for adhering a film as a clad on a cladding substrate on which a core is formed by an adhesive. FIG. 4A is common with FIG. 3A, and FIG. 4B is common with FIG. 3C. FIGS. 4C to 4E are common with FIGS. 3D to 3F. The process from the formation of a core master template to the formation of the optical waveguide core on a cladding substrate 30 on which an electroconductive pattern 31 is formed is shown. FIG. 4F illustrates a sectional view of the polymer optical waveguide 60 obtained by the process of sticking a cladding layer 52 (a cladding film) to the core forming surface of the cladding substrate 30 using an adhesive layer 54, the polymer optical waveguide 60 perpendicularly cut along the longitudinal direction of the core.

In the invention, the rubber mold has the rubber layer including rubber. Even if the electroconductive pattern is formed on the forming side of the optical waveguide core as shown in FIG. 4, the optical waveguide core can be formed without negatively affecting the electroconductive pattern.

Description will be given of a process for producing a polymer optical waveguide according to the invention according to the order of steps of the process below.

1) Preparing a rubber mold having a composite layer structure in which a rubber layer which has a concave portion corresponding to an optical waveguide core part and contains a rubber mold-forming curable resin is buried in a rubber layer-forming concave portion of a rigid substrate having the rubber layer-forming concave portion.

Though the rubber mold is preferably produced by using the core master template in which the convex portion corresponding to the optical waveguide core is formed, it is not limited thereto. In the following, the method for using the core master template will be described.

<Preparation of Core Master Template>

A core master template on which convex portions corresponding to an optical waveguide core are formed can be manufactured using a prior art process, for example a photolithographic process and a RIE method without placing any specific limitation thereon. Furthermore, a process for producing a polymer optical waveguide by an electrodeposition method or an photovoltaic electrodeposition method which was previously filed for a patent by the applicant of this application (JP-A No. 2002-333538) can be also applied to manufacture a master template. Sizes of the convex portions, corresponding to the optical waveguide core formed on a core master template are generally about 5-500 µm, and preferably about 40-200 µm, and may be determined appropriately according to an application or the like of a polymer optical waveguide. For example, in a case of an optical waveguide for use in a single mode, a core of the order of 10 µm square is generally used and, in a case of an optical waveguide for use in a multimode, a core of the order in the range of 50 to 100 µm square is generally used, but an optical waveguide having a core part of the order of hundreds of µm square is also used according to an application.

<Preparation of Rubber Mold>

As described above, the rubber mold has a composite layer structure in which the rubber layer which has the concave portion corresponding to the optical waveguide core and contains the rubber mold-forming curable resin is buried in the rubber layer-forming concave portion of the rigid substrate having the rubber layer-forming concave portion. The rubber mold-forming curable resin is applied or injected into the rubber layer-forming concave portion of the rigid substrate. The rubber mold-forming curable resin is cured by performed the curing process such as a heat-treatment if necessary. Then the rigid substrate and the rubber layer integrated are removed from the master template and thereby the rubber mold is produced.

As described above, the rigid substrate has the rubber layer-forming concave portion, and the rubber layer is formed in the rubber layer-forming concave portion. In other words, when the rigid substrate is brought into close contact with the core master template, the space is caused by the rigid substrate, the core master template and the core convex portion. When the space is filled with the rubber mold-forming curable resin, and the resin is cured to form the rubber layer. It is preferable that a groove part having the shape that is approximately similar to the concave portion of the rubber layer, which is corresponding to the optical waveguide core, is formed in the rubber layer-forming concave portion. The groove part is formed so as to correspond to the concave portion formed in the rubber layer (see FIG. 1B). It is preferable that the groove depth and the groove width of the groove part are 1 μ-3 mm larger than those of the concave portion of the rubber layer, and more preferably in the range of 0.03 to 1.0 mm. In this case, it is preferable that the maximum thickness of the rigid substrate is in the range of 0.05 to 40 mm and more preferably in the range of 0.1 to 10 mm. The effect of the invention can be preferably exhibited by making the size of the groove part and the thickness of the rigid substrate the range.

Examples of the rigid substrate include a film substrate, a ceramic-resin compound substrate, a ceramic substrate, a silicon wafer substrate, a resin substrate, and a glass substrate. Especially, a quartz substrate having high transparency, a film substrate having high smoothness, a heat-resistant film substrate, a silicon compound substrate, and an acrylic resin substrate are preferable.

When a photo-curable resin is used as the rubber mold-forming curable resin, the rigid substrate should have a material which transmits light of the wavelength that photo-cures the rubber mold-forming curable resin so as to cure the resin.

When a photo-curable resin is used as the core-forming curable resin, the rigid substrate and the rubber layer should have a material which transmits the light of the wavelength that photo-cures so as to cure the resin. Specifically, the transmittance of the rigid substrate and rubber layer with respect to the light having the wavelength that photo-cures the core-forming curable resin is preferably 50%/mm or more, and more preferably 70%/mm or more.

An introducing inlet for filling the core-forming curable resin to the concave portion corresponding to the convex portion and an outlet for exhausting the resin from the concave portion corresponding to the convex portion are formed on the rubber mold. The forming method is not particularly restricted. Though the convex portion corresponding to the introducing inlet and the outlet can be formed on the master template beforehand, as a simple method, after the mold-forming rubber layer is formed by the mold-forming curable rubber liquid on the master template, the mold is removed, and the introducing inlet and the outlet are formed by cutting both ends of the mold so as to expose the concave portion. A soft rubber material of which the rubber hardness is in the range of 10 to 35 is used as the rubber material formed by the molding master template of the core, and the soft rubber elasticity improves the molding property of removing after the core part is formed) and gives a precise core formation ability. Especially, the highly smooth surface of the molding resin can be achieved by the rubber material having low hardness and low surface energy. In the rubber layer, the proper value of the rubber thickness in which the concave portion strengthen material having high rigidity is comparatively thin to the rubber thickness and which has the durability to the shape distortion and the vibration can be selected in order to maintain the mold accuracy to the vibration and the pressure change at the time of injecting the core material with a high degree of accuracy.

It is effective to form a penetration hole communicated with the concave portion of the rubber mold at both ends of the concave portion. The penetration hole of the introducing inlet side can be used as the pool of the liquid (resin), and the inside of the concave portion can be connected to a reduced-pressure-suction device by inserting the reduced-pressure suction tube into the penetration hole of the exhaust side. It is also possible to connect the penetration hole of the introducing side to an injection tube of core-forming curable resin liquid and to pressurize and inject the resin liquid. The penetration hole may be formed so as to correspond to each concave portion according to the pitch of the concave portion, and one penetration hole communicated with each concave portion in common may be formed.

The thickness of the rubber layer is determined appropriately while giving a consideration to handling properties as a mold, and the maximum thickness of the all layers is generally from about 10 μm to about 50 mm. The transformation at the time of removal can be adjusted by the thickness and the rubber hardness (elasticity). The interfacial failure from the core master template can be suppressed, and the core surface damage at the time of removal can be also suppressed when the core is molded. In that sense, the rubber hardness, the thickness, and the surface energy of rubber mold-forming curable resin are related mutually, and an important control characteristic values due to the demanded molding accuracy. The optical waveguide core can be formed easily and partially on the substrate on which an electronic device or an electric circuit exists in adjacent by satisfying these demands postulated.

The removal from the rubber mold may be promoted by performing mold release process such as applying a mold release agent to the core master template beforehand. However, it decreases the molding property of the surface.

It is preferable that the cured resin can be removed from the core master template easily, has the mechanical strength and the dimensional stability required for molds (which are used repeatedly), has the hardness which maintains the concave portion shape, and has the excellent adhesion with the cladding substrate as rubber mold-forming curable resin. Various additives can be added to rubber mold-forming curable resin if necessary.

A rubber mold forming resin can be applied and cast on the surface of a core master template, and has to perfectly copy the convex portion corresponding to individual optical waveguides formed on the core master template, so the resin preferably has a viscosity of a value or less, for example, from about 500 to about 7000 mPa·s. A solvent for modifying a viscosity can be added to a level at which no adverse influence acts.

As the rubber mold forming resins, a curable organopolysiloxane which becomes a silicone rubber (a silicone elastomer) or a silicone resin after cured can be preferably used from view points of removing ability, mechanical strengths and dimensional stability. The curable organopolysiloxane preferably includes a methylsiloxane group, an ethylsiloxane group or a phenylsiloxane group in the molecule. The curable organopolysiloxane may be one component or two component combined with a curing agent. The organopolysiloxane may be a thermosetting type or a room temperature curing type (for instance, the type which is cured by moisture in air). The organopolysiloxane may be the other curing type (UV-curing or the like).

The curable organopolysiloxane is preferably the one which becomes a silicone rubber after cured. A liquid silicone rubber (The one which has high viscosity, such as past, is included in "liquid".) is usually used. Two component combined with the curing agent is preferable. Especially, in the liquid silicone rubber of the addition type, the surface and the inside are uniformly cured for a short time, and no by-product material or little by-product material exists at that time. Also, the liquid silicone rubber has an excellent release property and a small shrinking rate, and thereby is preferably used.

Of the liquid silicone rubber, dimethyl siloxane rubber is preferable from view points the control of adhesiveness, removing ability, mechanical strength and hardness. Since the cured product of liquid dimethyl siloxane rubber generally has the refractive index of about 1.43, and the refractive index is low, the rubber mold made of dimethyl siloxane can be used as a cladding layer without removing from the cladding substrate. In this case, some device is needed to prevent the filled core-forming resin and the cladding substrate from removing from the rubber mold.

The viscosity of the liquid silicone rubber is preferably from about 100 to about 7000 mPa·s, and more preferably from about 1000 to about 4000 mPa·s from view point of the accurate copy of the convex portion corresponding to the optical waveguide core. When the viscosity is 500 mPa·s or less, the injection efficiency might be too high, and the rubber enters between the substrate having the clad and the rubber interface of the rubber mold. The deterioration of the shape accuracy may occur. When the viscosity is 7000 mPa·s or more, the injection speed does not increase and the productivity decrease even if the injection assistance means is used.

In addition, the surface energy of the surface of the outermost layer of the rubber mold which comes into contact with the core material is in the range of 100 μN/cm to 350 μN/cm, and more preferably in the range of 150 μN/cm to 240 μN/cm from view point of the adhesiveness to the cladding substrate and the infiltration speed of the core-forming curable resin. When the surface energy is 10 μN/cm or less, the infiltration of the liquid may become difficult. When the surface energy is 350 μN/cm or more, the surface damage may be caused on the surface of the cured molded product by the bonding of the surface when removing the rubber mold.

The Share rubber hardness (JIS K6253, ASTM D 2240) of the rubber layer of the rubber mold is preferably in the range of 10 to 45, and more preferably in the range of 15 to 30. The Share rubber hardness of the layer (the rubber layer) other than the outermost layer is preferably in the range of 45 to 120, and more preferably in the range of 70 to 110. The Share rubber hardness of the range is preferable from viewpoints of mold-preparing performance, maintenance of concave portion shape or removing ability. When the Share rubber hardness is less than 10, the shape accuracy is decreased, and the problem of the reproducibility of shape may be caused. When the Share rubber hardness is more than 120, the proper elasticity are not obtained at the time of removing from the rubber mold, and thereby the damage may be caused on the surface of the molded product.

The surface roughness (root mean square roughness (RMS)) of the rubber layer of the rubber mold is preferably 0.5 μm or less, preferably 0.1 μm or less from view point of template-preparing performance. Thereby the optical loss can be greatly decreased in the optical waveguide characteristic of the core formed. It is the necessary condition that the surface roughness is ½ or less of the wavelength of the light used. When the surface roughness is ¹⁄₁₀ or less, the wave guiding loss due to the core surface roughness of the light can almost be disregarded.

It is preferable that the rubber mold-forming curable resin of the rubber layer of the rubber mold has a light transmittance of 50%/mm or more in an ultraviolet region and/or a visible region. Especially, it is preferable that the rubber mold-forming curable resin has a light transmittance of 50%/mm or more for the light having the wavelength of 365 nm. The reason why the rubber mold-forming curable resin of the rubber mold is preferably light-transmissive in the visible region is that it is possible to position easily when the rubber mold is brought into close contact with the cladding substrate in the following process 2), and the appearance that the core-forming curable resin is filled to the rubber mold concave portion can be observed, and the filling completion or the like can be easily confirmed. The reason why the rubber mold is preferably light transmissive in the ultraviolet region is that the UV curing is performed through the rubber mold when a UV-curable resin is used as core-forming curable resin. It is preferable that the light transmittance of the rubber mold in ultraviolet region (350 nm-400 nm) is 50% or more.

The curable organopolysiloxane, especially, the liquid silicone rubber which becomes a silicone rubber after cured excels in adhesion with the cladding substrate and removing ability and has the ability copying a nanostructure. The adhesion of the silicone rubber and the cladding substrate can prevent the liquid from getting on. Since the rubber mold using such a silicone rubber copies the core master template with high accuracy, and is well brought into close contact with the cladding substrate, the core-forming resin can be efficiently filled only to the concave portion between the rubber mold and the cladding substrate, and the removal of the cladding substrate from the rubber mold is also easier. Therefore, the polymer optical waveguide which maintains the shape with a high precision can be produced from the rubber mold extremely easily.

Since the rubber layer of the rubber mold has rubber elasticity, a part of the rubber layer, that is, the part other than the part copying the core master template can be replaced with other rigidity materials. In this case, the handling ability of the rubber mold and the adaptability of the core material injection pressure change in the injection is improved.

2) Bringing a cladding substrate into close contact with the rubber mold;

The cladding substrate used in the invention is a silicon substrate or an electric circuit substrate, and a silicon wafer substrate, a glass substrate, a ceramic substrate, and a plastic substrate or the like can be used as the substrate without placing any specific limitation thereon. Though the substrate having a proper refractive index can be used as it is, the substrate which needs the refractive index control can be used by forming a resin or an inorganic material on the entire surface or part of the substrate by a PVD method. The refractive index of a cladding coat layer is preferably less than 1.55, and more preferably less than 1.50. Especially, it is necessary that the refractive index of a cladding coat layer is smaller by 0.01 or more than that of the core material. The cladding layer has preferably a smoothness in which Ra is 0.1 μm or less, and more preferably 60 nm or less, excels in adhesion with the rubber mold. When the cladding layer and the rubber mold are brought into close contact with each other, the gap other than the rubber mold concave portion is not preferably caused. When the cladding substrate does not excel in the adhesion with the rubber mold and/or the core, the adhesion with the rubber mold or the like is preferably improved by performing a process by an ozone atmosphere or an ultraviolet ray irradiation process having a wavelength of 300 nm or less.

Of the plastic substrates, the polymer optical waveguide in which a flexible film substrate is used can be used as an optical interconnection between a coupler and a board, an optical branching filter, or the like. The film substrate is selected depending on use purposes of the polymer optical waveguide produced, considering optical properties such as refractive index, light transmissivity, mechanical strength, heat resistance, adhesiveness to the mold, the flexibility of the material, or the like.

Examples of the material of the cladding layer of film substrate include an acrylic-based resin(polymethyl methacrylate or the like), an alicyclic acrylic resin, a styrene-based resin (polystyrene, acrylonitrile.styrene copolymer or the like), an olefine-based resin (polyethylene, polypropylene, ethylene.propylene copolymer or the like), an alicyclic olefin resin, a vinyl chloride resin, a vinylidene chloride-based resin, a vinyl alcohol-based resin, a vinyl butyral-based resin, an arylate-based resin, a fluorine-containing resin, a polyester-based resin (polyethylene terephthalate, polyethylene naphthalate or the like), a polycarbonate-based resin, cellulose diacetate or cellulose triacetate, an amid-based resin (aliphatic and aromatic polyamide or the like), an imide resin, a sulfonic-based resin, a polyether sulfonic-based resin, a polyether ether ketone-based resin, polyphenylene sulfide-based resin, a polyoxymethylene-based resin, or the blend of the resins.

As the alicyclic acryl resin, OZ-1000, OZ-1100 (trade name: manufactured by Hitachi Chemical Co., Ltd.) or the like, in which an aliphatic cyclic hydrocarbon such as tricyclodecane is introduced into an ester group is used.

Examples of the alicyclic olefin resin include an olefin having a norbornene structure in a main chain thereof, and an olefin having a norbornene structure in a main chain and a polar group such as an alkyloxycarbonyl group (an alkyl group thereof has 1 to 6 carbon atoms or is a cycloalkyl group) in a side chain thereof. An alicyclic olefin resin having a norbornene structure in a main chain and a polar group such as an alkyloxycarbonyl group in a side chain thereof has superior optical properties such as a low refractive index (refractive index: about 1.50, which ensures a difference in the refractive index between the core and the clad) and a high light transmissivity, and is excellent in adhesiveness to the mold and heat resistance, and hence, this film is particularly suitable for producing a polymer optical waveguide of the invention.

The refractive index of the film substrate and the cladding layer material is preferably is less than 1.55, and more preferably less than 1.53 so as to secure the refractive index difference with the core.

The thickness of the film substrate is appropriately selected giving a consideration to a flexibility and easiness in handling or the like, and in general preferably from about 0.1 mm to about 0.5 mm.

The electric circuit is formed on the entire surface or part of the optical waveguide non-forming part of the cladding substrate by applying an electroconductive layer, a PVD method or a bonding method of a foil. The electroconductive layer is patterned by a common method (a photolithography method, a dry etching method, a laser heating scanning method and an electric discharge processing method or the like). Metals such as chrome, copper, aluminum, gold, molybdenum, nickel, silver, platinum, iron, titanium, zinc, tungsten and tin, or one layer or the compound thin film layer which are made of alloys or the like including the metals, a thin film or the like obtained by adding an electroconductive fine powder such as carbon black to an electroconductive metal compound and a polymeric material are used as an electric circuit electroconductive layer. Especially, the electroconductive pattern of the electric circuit is preferably gold, copper, aluminum, molybdenum, nickel and alloy thereof which are suitable for a wire bonding method and a flip chip mounting in order to mount the electrical conductivity of each electronic device and an optical control device.

The film thickness of the electroconductive layer is preferably from about 0.05 to about 30 μm. The film thickness of the electroconductive layer is more preferably in the range of 0.2 to 2 μm.

It is preferable that the electroconductive layer for the electric circuit is provided on the optical waveguide non-forming surface of the cladding substrate. The electroconductive layer can be accumulated.

3) Filling the concave portion of the rubber mold, with which brings a cladding substrate has been brought into close contact, with a core-forming curable resin In order to fill the core-forming curable resin to the rubber mold concave portion, a cladding film which is one size larger than the rubber mold is brought into close contact with the rubber mold, and several droplets of the core-forming curable resin are supplied into the introducing inlet of the concave portion, and the concave portion can be filled with the resin by capillarity. In addition, the core-forming curable resin can be filled in the concave portion by pressurizing filling, by pressure-reduced suction from the outlet of the concave portion, or by the pressurizing filling and the pressure-reduced suction in combination. When a penetration hole is formed on the end part of the concave portion as described above, the injection efficiency can be further increased by pooling the resin in an introducing side penetration hole, and pressurizing and filling the resin, by inserting the reduced-pressure suction tube into the exhaust side penetration hole and sucking by reducing pressure, and by using both in combination. When the pressurizing filling and the reduced-pressure suction are used in combination, it is more preferable to perform them simultaneously. The gradual increase of pressure on the pressurizing filling and the gradual decrease of pressure on the reduced-pressure suction are preferable from view point in which the core-forming curable resin is injected at high speed or more in the state that the rubber mold is stably fixed, and reciprocity law is approved.

A radiation curable resin, an electron beam curable resin and a thermosetting resin or the like can be used as the core-forming curable resin, and especially an ultraviolet curable resin is preferably used.

A UV-curable monomer or a UV-curable oligomer, a thermosetting monomer or a thermosetting oligomer, and a mixture of a monomer and an oligomer are preferably used as the core-forming UV-curable resin or the core-forming thermosetting resin. Especially, the mixture of the oligomer helps the curing speed, and is useful for the accuracy improvement of the shape.

As the UV-curable resin, an epoxy-based, polyimide-based or acryl-based UV-curable resin is preferably used.

It is necessary for the core-forming curable resin to have a low viscosity such that the core-forming curable resin can be filled in the space (the concave portion of the rubber mold) formed between the rubber mold and the film substrate. The viscosity of the curable resin is in the range of 50 mPa·s to 2000 mPa·s, preferably in the range of 100 mPa·s to 1000 mPa·s, and more preferably in the range of 300 mPa·s to 700 mPa·s from view points of the filling speed, the goodness the core shape and few of optical loss. When the viscosity of the curable resin is 50 mPa·s or less the resin enters an unnecessary space between the rubber mold, and thereby the moldability may be damaged. When the viscosity of the curable resin is 2000 mPa·s or more, the infiltration speed is extremely slow, and thereby the productivity is decreased.

Still furthermore, the curable resin is necessary to have a small change between volumes before and after curing in order to reproduce an original shape of a convex portion corresponding to an optical waveguide core formed on a core master template with a high precision. For example, reduction in volume causes increase in a wave guiding loss. Therefore, a curable resin preferable is with the lowest possible change in volume and the change in volume is 10% or less and preferably in the range of 0.01 to 4%. It is preferable to avoid making a viscosity of a curable resin lower using a solvent since a low viscosity caused by a solvent increases a change between volumes before and after curing. Especially, the material system of which the change in volume is 0.01% or less or the volume expands has a low peeling efficiency from the rubber mold, and the surface deterioration such as the breaking of the surface is caused when removing from the rubber mold. Thereby the smoothness of the surface is unpreferably reduced, and the optical wave guiding loss unpreferably rises.

A polymer can be added to the resin such that the volume change (shrinkage) after the core-forming curable resin is cured is reduced. The polymer preferably has a miscibility with the core-forming curable resin, without adversely affecting the refractive index, the elasticity modulus and the transmissivity of the resin. The volume change can be reduced by adding a polymer, and the viscosity and the glass transition point of the cured resin can be highly controlled. For instance, an acrylic polymer, a methacrylate polymer and an epoxy polymer are used as the polymer, and the polymer is not limited to thereto.

The refractive index of the core-forming curable resin cured is preferably in the range of 1.20 to 1.60, and more preferably in the range of 1.4 to 1.6. Two kinds of resins or more having different refractive indexes that the refractive index of the core-forming curable resin cured in the range are used. It is necessary that the refractive index of the core-forming curable resin cured is larger than that of the film substrate (contains a cladding layer in the following process 5) which becomes a clad. The difference of the refractive index of the core and that of the clad (the cladding substrate and the cladding layer) is preferably 0.01 or more, and more preferably 0.05 or more.

In the process, In order to promote the filling of the core-forming curable resin by capillarity to the rubber mold concave portion (about 0.1-200 Pa), it is desirable to reduce the pressure in this entire system (to a level of about 0.1 to 200 Pa).

In order to facilitate the filling, it is effective to heat the core-forming curable resin filled from the introducing inlet of the rubber mold, in addition to the pressure reduction of the system, thereby reducing the viscosity of the curable resin.

4) Process of curing the core-forming curable resin filled

The core-forming curable resin filled is cured. A UV-lamp, a UV-LED and a UV-irradiation device or the like are used for curing a UV-curable resin. Heating in an oven or the like is used for curing a thermosetting resin.

5) Process of removing the rubber mold from the cladding substrate

The rubber mold is removed from the cladding substrate after the process 4). The rubber mold used in the processes 1) to 3) is used as it is as a cladding layer if the rubber mold meets the conditions such as the refractive index. In this case, the rubber mold may be used as it is as a cladding layer without removing the rubber mold. In this case, it is preferable that the rubber mold is subjected to an ozone treatment in order to improve the adhesiveness between the rubber mold and the core material.

6) Process of forming a cladding layer on the cladding substrate on which the core has been formed Though the cladding layer is formed on the film substrate on which the core is formed, the cladding layer include a film (for instance, the cladding brush material used in the process 2)), a layer obtained by applying and curing the cladding curable resin, and a polymer membrane or the like obtained by applying and drying the solvent solution of the polymeric material. A UV-curable resin and a thermosetting resin are preferably used as the cladding curable resin, and, for instance, monomer and oligomer which is UV-curable or thermosetting, or the mixture of the monomer and the oligomer is used.

A polymer (for instance, methacrylate type and epoxy type) which has a miscibility with the resin without adversely affecting the refractive index, the elasticity modulus and the transmissivity of the resin can be added to the resin in order to reduce the volume change (shrinkage) after the cladding forming curable resin is cured.

Though an adhesive is used when a film is used as a cladding layer, in that case, it is preferable that the refractive index of the adhesive is near that of the film. The UV-curable resin or the thermosetting resin is preferably used as for the adhesive used, and, for instance, monomer or oligomer which is the UV-curable or thermosetting, or the mixture of the monomer and the oligomer is used.

The polymer added to the cladding layer can be added such that the volume change (shrinkage) after the UV-curable resin or the thermosetting resin is cured is reduced.

The difference between the refractive index of the cladding substrate and that of the cladding layer is preferably smaller. The difference is within 0.1, more preferably within 0.05, and even more preferably within 0.001. It is most preferable that there is no difference from viewpoint of the confinement of light.

In the process for producing the polymer optical waveguide of the invention, a combination of a liquid silicone rubber which is cured and becomes gummy, especially liquid dimethylsiloxane rubber, as the rubber mold-forming curable resin, and alicyclic olefin resin which has a norbornene structure in the main chain and has a polar group such as an alkyloxycarbonyl group in a branched chain, as the cladding substrate, is excellent in adhesiveness of both, and the concave rubber mold part structure is not transformed. Even if the sectional area of the concave portion structure is extremely smaller (for instance, rectangle of 10×10 μm), the concave portion can be quickly filled with the curable resin.

It is preferable to reinforce the rigid substrate with a reinforced member in the process 1) in the process for producing the polymer optical waveguide of the invention. The reinforced member contain a metal material, a ceramic material, a hard plastic material and a ceramic-resin composite material or the like, and the maximum thickness is preferably in the range of 0.5 mm to 40 mm. An inlet (see a virtual line 24*b* shown in FIG. 8A) for pressurizing injection of the core-forming curable resin is formed in the reinforced member. An injection tube is inserted and connected to the inlet. It is preferable that a plurality of inlets are provided, and the pressurizing state is uniform in the introducing part (filling inlet) of each concave portion. In addition, an outlet (see a virtual line 24*c* shown in FIG. 8A) is provided on the opposite side of the inlet of the reinforced member (side in which the core resin is exhausted from rubber mold concave portion) such that the filling speed is further increased by making the inside of the rubber mold the state of reduced-pressure. A reduced-pressure deaerating tube is inserted and connected to the outlet, and the reduced-pressure suction can be performed from the concave portion exhaust side. It is preferable that a plurality of outlets is provided, and the reduced-pressure state is prevented from biasing in the exhaust side of the rubber mold concave portion.

In order to increase the filling speed as described above, the core-forming curable resin is pressurized and filled from the introducing part of the rubber mold, and the reduced-pressure suction from the exhaust side of the rubber mold concave portion is added to this. Even when the pressure change of pressurizing or reduced-pressure occurs, the positional gap of the reinforced member and the cladding substrate is prevented from being caused by providing the reinforced material. The rubber mold is prevented from being transformed by the generation of the vibration in the entirety or the part of the rubber mold and adhesion with the cladding substrate can be prevented being ruined. The filling speed can be enlarged without sacrificing the accuracy of the core shape.

An aspect using a rubber mold in which the reinforced member is provided will be described by using FIGS. 5 to 8.

Figure 5A:
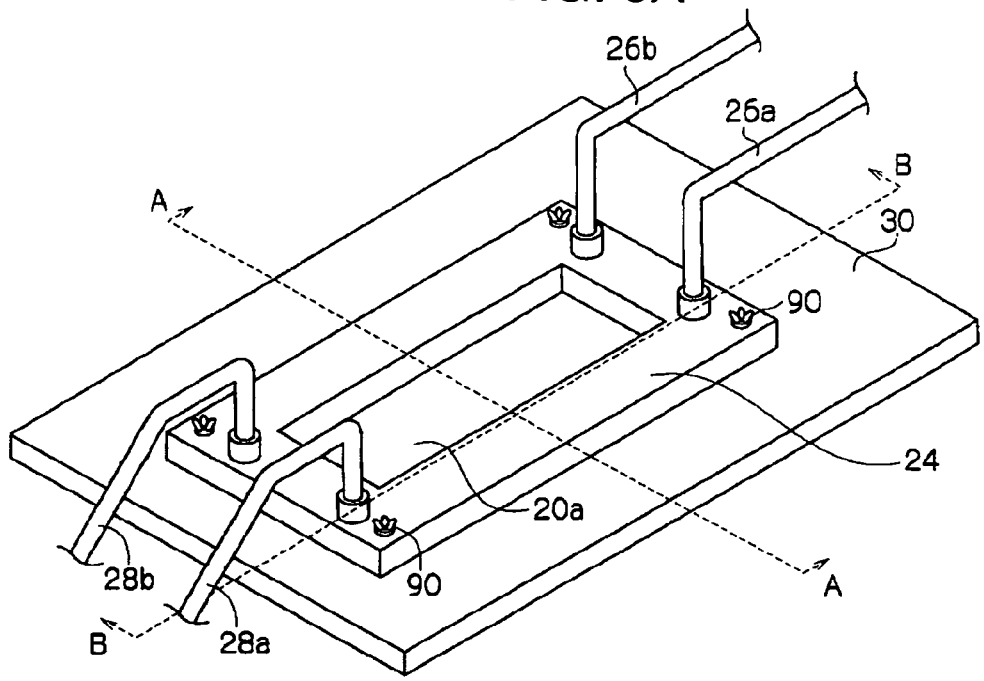
FIGS. 5A to 5C are conceptual views illustrating a core material filling process using a rubber mold provided with a reinforced member.
Figure 5B:
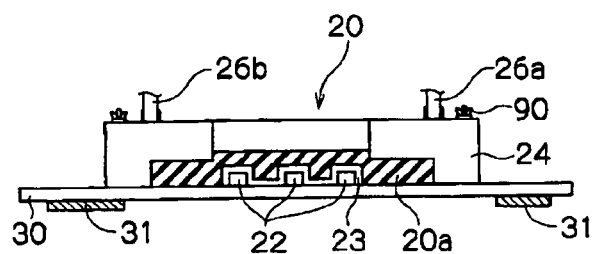
Figure 5C:
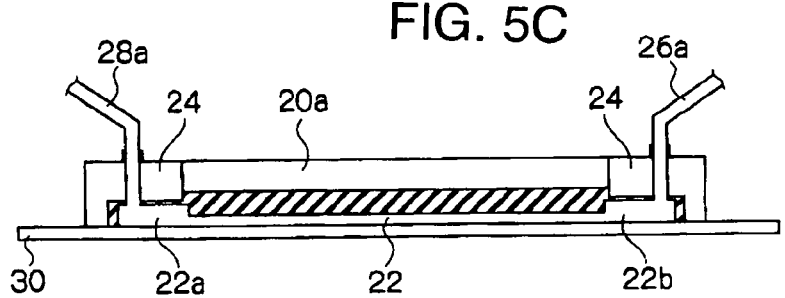

FIG. 5A illustrates a perspective view in which a rubber mold on which a reinforced member is provided into close contact with a cladding substrate 30. In FIG. 5A, numeral 24 designates a reinforced member, and the rubber mold concave portion forming area (a UV-irradiation area) has a structure in which the reinforced member has notch. Numerals 26*a*, 26*b* designate injection tubes, and numerals 28*a*, 28*b* designate reduced-pressure deaerating tubes. Numeral 90 designates a screw for fixing a reinforced member 24 and a cladding substrate 30 such that the positional gap of the reinforced member 24 and the cladding substrate 30 is not caused. Numeral 20*a* designates a rubber layer of the rubber mold, and the rubber layer is not covered with the reinforced member 24. FIG. 5B is an A-A sectional view of FIG. 5A, and Numeral 22 designates a rubber mold concave portion. FIG. 5C is a B-B sectional view of FIG. 5A, and both ends of the rubber mold concave portion have space parts 22*a*, 22*b* which are communicated with the introducing part 22*a* and exhaust part of a core-forming curable resin.

Figure 6A:
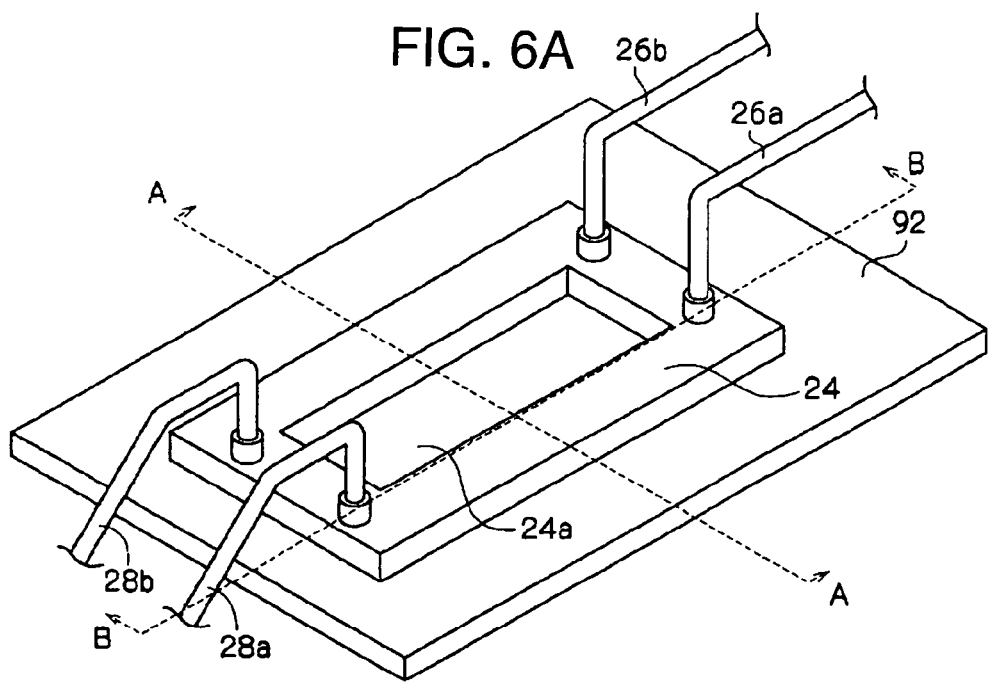
FIGS. 6A to 6C are conceptual views illustrating another core material filling process using a rubber mold provided with a reinforced member.
Figure 6B:
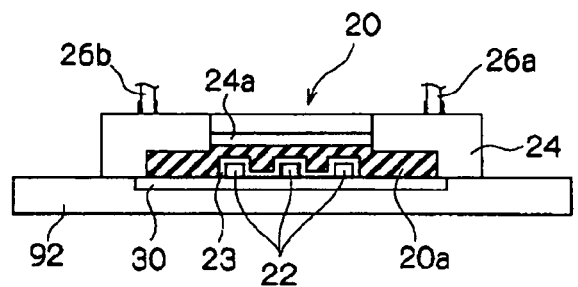
Figure 6C:
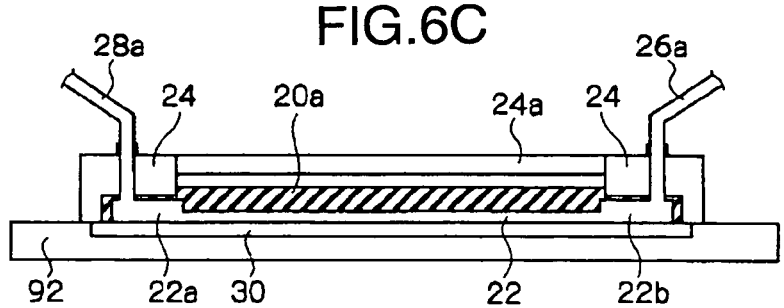

In the aspect shown in FIGS. 6A and 6B, the example using the rubber mold having the reinforced member similar to FIG. 5 is shown, and a holding member 92 which has a holding part (concave portion) for holding a cladding substrate is used such that the positional gap of the rubber mold and the cladding substrate 30 is not caused. This is also especially effective when the flexible film as the cladding substrate is used. In the example, a top plate 24*a* having optical transmittance such as a quartz plate, a glass plate and a hard plastic plate is used for the rubber mold concave portion forming area (UV-irradiation area). Since other compositions are similar to FIGS. 5A and 5B, the same reference numerals are assigned to identical components to preclude the necessity for a repeated explanation thereof.

Figure 7A:
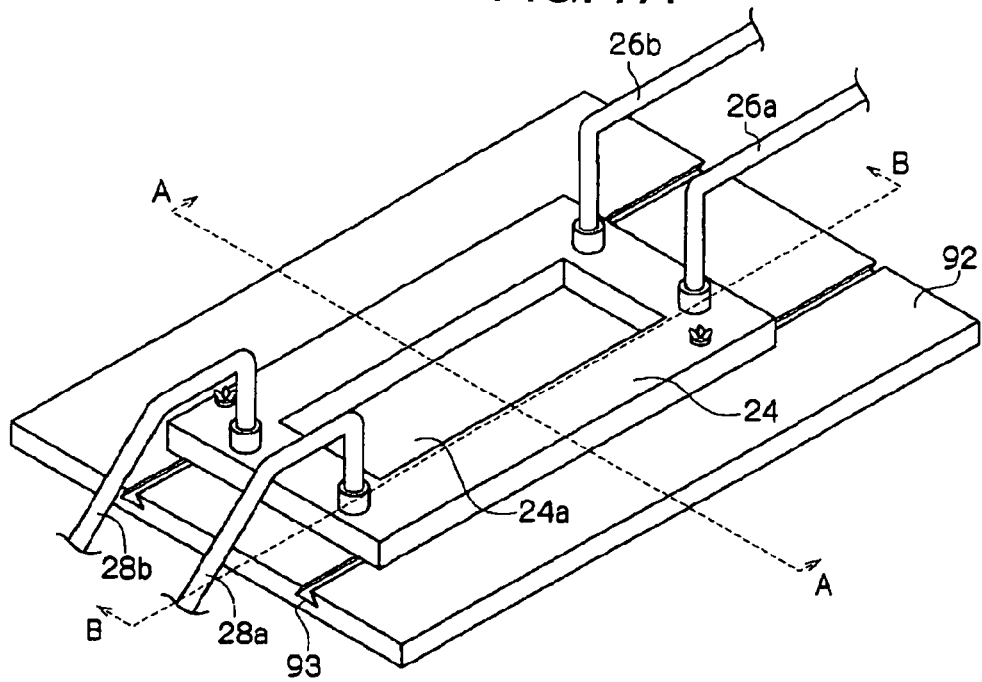
FIGS. 7A to 7C are conceptual views illustrating another core material filling process using a rubber mold provided with a reinforced member.
Figure 7B:
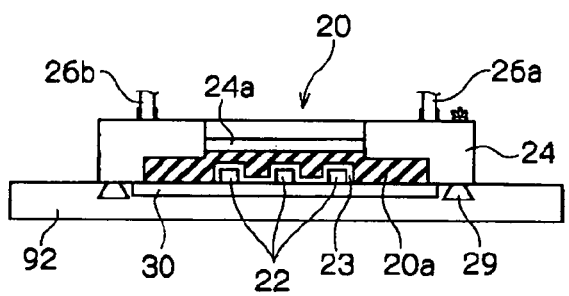
Figure 7C:
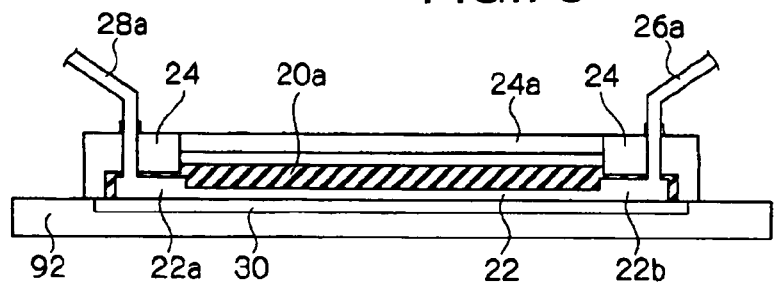

In the aspect shown in FIGS. 7A and 7B, an engaging groove 93 for fixation is formed on the holding member 92. On the other hand, an engaging member 29 is provided on the reinforced member 24 of the rubber mold, and sets the engaging member 29 is engaged in the groove 93. Since other compositions are similar to FIGS. 5A and 5B, the same reference numerals are assigned to identical components to preclude the necessity for a repeated explanation thereof.

It is preferable that space for pressure easing is provided on the rubber layer of the rubber mold on which the reinforced member described above is provided when a plurality of optical waveguide cores are formed on the cladding substrate. The space means a common space which is communicated with all the introducing part (filling inlet of core-forming curable resin) at one end of a plurality of concave portions of the rubber mold. It is preferable that the space which is communicated with all the outlets on the other end part of a plurality of concave portions of the rubber mold is provided in addition to the gap. The injection pressure does not act directly on the introducing part by providing the space part on the introducing part, and the injection pressure to each introducing part is eased and is made uniform. The easing and uniformity of sucking negative pressure are obtained by forming the exhaust part gap, and the injection of the resin into each concave portion of the rubber mold is made uniform.

The sectional area of the space part is preferably 5 to 20000 times the total sectional area of all the concave portions, and more preferably 500 to 2500 times. (Herein, "the total sectional area of all the concave portions" means the total of the area of the edge part in each concave portion communicated through the space part.)

FIG. 8 is a sectional view illustrating one example of the rubber mold in which the space part in the introducing part and the exhaust part is formed.

Figure 8A:
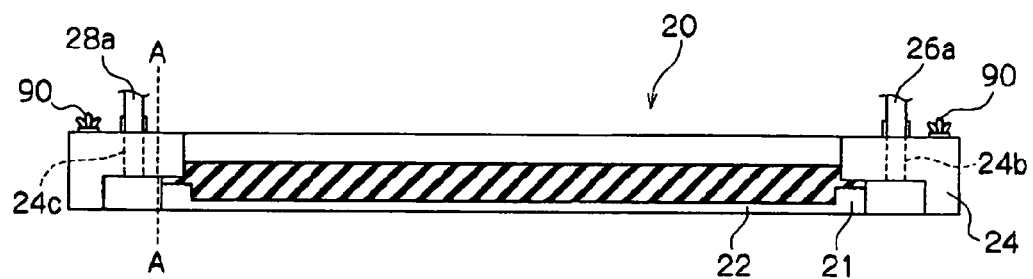
FIGS. 8A and 8B are views illustrating one example in which a gap for stress relaxation is formed in a rubber layer of a rubber mold.

FIG. 8A illustrates a cross section into which the rubber mold is cut such that the rubber mold concave portion and the space part appear. In FIG. 8A, numeral 20, 21, 22, 24, 24*b* and 24*c* designate a rubber mold, a space part, a concave portion, a reinforced member, an inlet provided on the reinforced member, and an exhaust part respectively.

Figure 8B:
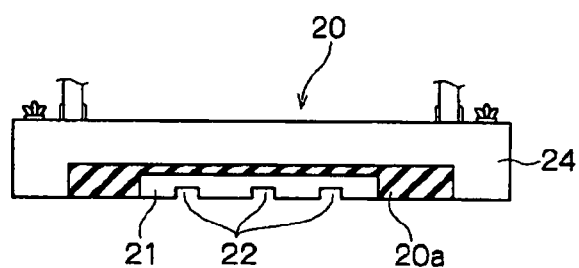

FIG. 8B illustrates a cross section into which FIG. 8A is cut by the A-A line.

The preferable aspect of the invention described above is brought together as follows. The invention is not limited thereto.

In the process for producing the polymer optical waveguide of the invention, it is preferable that a groove part which has a shape that is approximately similar to that of the concave portion of the rubber layer and is 1 μm to 3 mm larger than a groove depth and a groove width of the concave portion of the rubber layer is contained in the rubber layer-forming concave portion of the rigid substrate, and the maximum thickness of the rigid substrate is in a range of 0.05 to 40 mm.

The core-forming curable resin is preferably photo-curable, and the rigid substrate and the rubber layer preferably contain the material which transmits the light of the wavelength that photo-cures the core-forming curable resin.

In this case, the transmittance of the rigid substrate and the rubber layer with respect to the light having the wavelength that photo-cures the core-forming curable resin is preferably 50%/mm or more.

The transmittance of the rubber layer with respect to the light having the wavelength that photo-cures the core-forming curable resin is preferably 50%/mm or more.

The rubber mold preferably has a reinforced member which reinforces the rigid substrate, and the inlet for the core-forming curable resin is preferably formed on the reinforced member.

The reinforced member preferably contains a metal material, a ceramic material, or a plastic material.

The layer of the core-forming curable resin preferably has space for the stress relaxation at a part communicated with an introducing part and/or an exhaust part at both ends of the concave portion.

The rubber mold-forming curable resin is preferably a silicone-based rubber material.

The cladding layer is preferably formed on the entire surface or part of the surface of the cladding substrate.

The reduced-pressure suction is preferably performed from the exhaust side for the core-forming curable resin of the concave portion of the rubber mold during filling the concave portion of the rubber mold with the core-forming curable resin. The pressurizing filling is preferably performed from the injection side for the core-forming curable resin of the concave portion of the rubber mold simultaneously with the reduced-pressure suction. The pressurizing filling and/or the reduced-pressure suction is preferably performed at static pressure. The pressure in the pressurizing filling and/or the reduced-pressure in the reduced-pressure suction is preferably gradually changed and controlled.

The maximum thickness of the rubber layer is preferably in the range of 5 µm-5 mm.

The Share rubber hardness of the rubber mold-forming curable resin of the rubber mold is preferably in the range of 10 to 45.

The surface energy of the rubber layer is preferably in the range of 100 µN/cm to 350 µN/cm.

The surface roughness of the surface of the rubber layer which comes into contact with the core-forming curable resin is preferably 0.5 µm or less.

The cladding substrate is preferably a ceramic-resin compound substrate, a film substrate, a ceramic substrate or a silicon wafer.

The viscosity of the core-forming curable resin before being cured is preferably in the range of 50 mPa·s to 2000 mPa·s.

The difference between the refractive index of the cladding substrate and that of the core-forming curable resin is preferably 0.01 or more.

In the above invention, the process for producing the polymer optical waveguide is very easy and low-cost, and the polymer optical waveguide to the electric circuit combination substrate can be easily formed at a low-cost. Since the shape of the polymer optical waveguide formed can be freely set, the waveguide can be formed on the irregularity side of the electronic device, and can be formed on the device in which electric circuit such as a silicon wafer is buried or the adjacent portion thereof. In addition, the process of the invention has an extreme highly accurate shape reproducibility and a small wave guiding loss though the producing process is simple. Even if the flexible film substrate is used as the substrate having the cladding layer, the polymer optical waveguide which can be freely loaded to various equipments is obtained.

EXAMPLES

While description will be given of the present invention, showing examples in a more detailed fashion below, it should be understood that the present invention is not limited to the examples.

Example 1

<Preparation of a Rubber Mold>

A UV-curable type thick film resist (manufactured by Microchemical Corp., with a trade name SU-8) is applied on a quartz substrate by a spin coat method, thereafter the coat on the quartz substrate is prebaked at 80° C., the resist is exposed to light by a high-pressure mercury light through a photomask, the exposed resist is developed to form five convex portions with a section in the shape of a square (50 µm in width, 50 µm in height, 500 µm in pitch and 50 mm in length). Then, the convex portion is post baked at 120° C. to form a core master template.

Then, a reinforced member (the thickness of 1.5 mm, and made of aluminum) in which the opening corresponding to a UV-irradiation part is formed and which has three inlets and three outlets is prepared. The rubber layer-forming concave portion including groove parts which (100 µm in width, 100 µm in height, 500 µm in pitch and 50 mm in length, five) are formed in the same pitch as the convex portion of the core master template and have a shape that is approximately similar to that of the convex portion of the core master template is produced on a quartz transparent rigid substrate having a thickness of 2 mm by a photolithography process and a hydrofluoric acid etching process. The rubber layer-forming concave portion is combined with the reinforced member. The core master template is covered with the reinforced member.

Next, a mixture in which a thermosetting liquid dimethylsiloxane rubber (manufactured by Dow Corning Asia Ltd., with a trade mark SYLGARD 184, the viscosity: 1000 mPa·s) as rubber mold-forming curable resin and a curing agent are mixed is poured from an opening of a reinforced member (In this case, the end piece part of the convex portion of the core master template is not covered with the rubber). The mixture is cured by heating at 130° C. for 20 minutes. At this time, the rubber material has a Share rubber hardness of 15, a surface energy of 180 µN/cm and an average rubber thickness of 49 µm. After curing, the one that the rubber layer, the transparent rigid substrate and the reinforced member are integrated is removed from the core master template, and thereby, a rubber mold is produced. The rubber mold has the concave portion corresponding to the convex portion, an introducing inlet for filling core-forming curable resin to the concave portion, and an exhaust outlet for exhausting the resin from the concave portion.

<Formation of a Conductive Pattern to a Cladding Substrate>

An Arton film (film thickness 100 µm) is heated at 160° C., and a chrome bonding layer of 0.2 µm and a copper conductive layer of 0.8 µm are formed all over the surface of the one side of the Arton film by a vacuum deposition method to form a metal conductive layer.

Next, a positive type resist (manufactured by Tokyo Ohka Kogyo., Ltd.) is applied by a spiner, thereafter the coat is prebaked at 80° C. for 2 minutes and thereby a resist film of 1.2 µm is obtained. Next, a vacuum sticking type maskaligner for UV-exposure having a high-pressure mercury light is used. The pattern exposure is performed by using pattern masks for a wiring pattern for control of surface emitting laser and for power supply wiring pattern. The development is performed by an alkali agent, and it is washed by water. It is post baked for 2 minutes at 130° C. Then copper and the chrome layer are removed by an etching liquid which consists essentially of iron chloride. The supersonic wave is then given while soaking in an acetone liquid, and, the resist film is removed. Afterwards it is washed by water. An electroconductive pattern made of a thin film metal on the Arton film is obtained. Various electronic devices are mounted on the Arton film, and thereby the electric circuit is formed. The electric circuit is covered with a film having an adhesive layer, and thereby the stain or the like is prevented.

<Formation of Optical Waveguide Core and Cladding Layer>

The rubber mold is pressurized and is brought into close contact with a non-forming surface of the film substrate which does not have the electric circuit on the Arton film. An injection tube and a reduced-pressure deaerating tube are connected with each inlet and each outlet of the reinforced member of the rubber mold in the part having no electric circuit. A UV-curable resin having the viscosity of 1300 mPa·s (trade name: manufactured by JSR corporation: PJ3001) is injected in the pressure of 30 kPa from a pressurizing injection tube into the concave portion of the rubber mold through a pressure adjusting controller. The reduced-pressure suction of −50 kPa at static pressure through the reduced-pressure deaerating tube is performed in the outlet of the rubber mold. The concave portion of the rubber mold can be filled with a UV-curable resin for 40 seconds.

The pressurizing injection tube and the reduced-pressure deaerating tube are removed from the rubber mold. The UV light of 30 mW/cm$^2$ is irradiated from an exposure opening of the rubber mold for 10 minutes, and core-forming curable resin is cured. The rubber mold is removed, and thereby the core having refractive index of 1.54 on the Arton film is formed.

Next, an UV-curable resin (manufactured by JSR Corp.) having a refractive index after cured of 1.51, which is the same as that of the Arton film, is applied to the entirety of the core-formed surface of the Arton film. Then, the resin was irradiated with UV light at an intensity of 50 mW/cm$^2$ for 10 minutes to cure the resin (film thickness after cured: 20 μm). A flexible polymer optical waveguide is obtained. The average wave guiding loss of the polymer optical waveguide is 0.12 dB/cm.

The Arton film is bonded to a seating part for a surface emitting laser provided on the conductive pattern by using an adhesive while an optical alignment is performed. Next, a surface emitting laser and a power supply wiring pattern are wire-bonded by a gold wire, and the optical waveguide to the waveguide is confirmed.

Comparative Example 1

The Arton film and the rubber mold made of a uniform rubber material having the Share rubber hardness of 80 are used, and an optical waveguide core and a cladding layer are formed in the same manner as in Example 1. Then the electric circuit is formed on the core non-forming surface of the Arton film in the same manner as in Example 1 to produce a polymer optical waveguide. The average wave guiding loss of three optical waveguide cores of the polymer optical waveguide is 5.3 dB/cm. Other two optical waveguide cores can not be confirmed. The shape deterioration of the optical waveguide core in the photolithography process in the formation of the electroconductive pattern of the electric circuit can be confirmed by a microscope.

Example 2

<Preparation of Rubber Mold>

A UV-curable type thick film resist liquid (manufactured by Microchemical Corp., with a trade name SU-8) is applied on a silicon wafer substrate by a spin coat method, thereafter the coat on the silicon wafer substrate is prebaked at 80° C., the resist is exposed to light by a high-pressure mercury light through a photomask, the exposed resist is developed to form ten minute convex portions with a section in the shape of a square (100 μm in width, 100 μm in height, 1 mm in pitch and 100 mm in length). Then, the convex portion is post baked at 120° C. A pressure easing gap producing convex portion is formed on the edge part of the convex portion of the convex portions produced thus by the mold respectively. A pressure easing gap producing convex portion has the section of 2 mm in height, 10 mm in width (a direction that is orthogonal to the convex portion), and 20 mm in length of the longitudinal direction of a substrate and of a rectangle.

Next, a reinforced member made of aluminum is produced, and the silica glass substrate is arranged on the exposure opening. The rubber layer-forming concave portions including the groove part which has the approximately similar shape in the same pitch as the convex portion of the core master template (250 μm in width, 250 μm in height, 1 mm in pitch and 100 mm in length, ten) are formed on the acrylic transparent rigid substrate having a thickness of 2 mm by a photolithography process and an etching process, and is integrated with a reinforced member.

Next, the thermosetting silicone rubber oligomer (made by Dow Corning Asia Ltd., with a trade mark SYLGARD 184, dimethylsiloxane) is applied on the surface of the convex portion side of the core master template such that one end of the longitudinal direction of the convex portion is exposed and the end of a gap producing convex portion existing the other end is covered. A reinforced member integrated with the rigid substrate is pressed thereto and fixed. Then, they are heated and cured for 18 minutes at 135° C., and the rubber layer, the rigid substrate and the reinforced member are integrated. The thickness of the rubber layer is 5 mm. Then it is removed from the core master template to obtain the rubber mold. The concave portion of 80 μm corner, the introducing part, the exhaust part and space part of the core-forming curable resin are formed in the rubber layer of the rubber mold. The Share rubber hardness of the rubber layer is 17.

<Preparation of Optical Waveguide Core and Cladding Layer>

The rubber mold is pressured and is brought into close contact with the non-forming surface of the electric circuit of the Arton film. An injection tube and a reduced-pressure deaerating tube are connected with each inlet and each outlet of the reinforced member of the rubber mold. The injection tube is connected to a pressurizing tank in which the core-forming curable resin is put. In addition, the pressurizing tank is directly connected to a nitrogen steel cylinder, and thereby the resin can be pressed into at static pressure. The reduced-pressure deaerating tube is connected to a vacuum pump through a pressure adjusting controller and a reduced-pressure tank, and the reduced-pressure suction is performed at static pressure which is adjusted. A UV-curable resin (manufactured by JSR Corporation) having the viscosity of 500 mPa·s injected into the rubber mold concave portion while sucking at static pressure simultaneously with pressurizing at static pressure.

The injection tube and the reduced-pressure deaerating tube are removed from the rubber mold after finishing the filling, and the UV light of 80 mW/cm$^2$ is irradiated for 8 minutes through the quartz window of the rubber mold, and core-forming curable resin is cured. The core of the refractive index of 1.55 is formed on the Arton film when the rubber mold is removed.

Next, a thermosetting resin of which the refractive index after cured of 1.51 is the same as that of a film (entire surface manufactured by JSR Corporation) is applied on the Arton film core forming surface. Then the thermosetting resin is heated and cured to obtain a flexible polymer optical waveguide. The average wave guiding loss of the polymer optical waveguide is 0.13 dB/cm. The excellent waveguide of light to the optical waveguide is confirmed in the same manner as in Example 1.

In the process for producing the polymer optical waveguide of the invention, the cladding layer or the cladding layer pattern is formed on the entirety of the substrate beforehand, and the polymer optical waveguide is then formed thereon. The photoelectric consolidation type circuit board which is adjacent to each electronic device on which the optical waveguide with a high precision is formed beforehand and on which an optical element and an electronic element in a high density consolidated can be easily produced.

Conventionally, the rubber mold is easily transformed, and is easily vibrated by the injection due to the reduced-pressure and the pressurizing when the core-forming curable resin is injected. In the process for producing the polymer optical waveguide of the invention, the core layer having a resistance property to the transformation and the vibration can be formed by using a rubber mold having a composite layer structure in which a rubber layer which has a concave portion corresponding to an optical waveguide core and contains a rubber mold-forming curable resin is buried in a rubber layer-forming concave portion of a rigid substrate having the rubber layer-forming concave portion.

The above structure easily provides an effective press adhesion to the cladding substrate so that the reliability of the adhesion can be obtained easily. In addition, the rubber layer having low surface energy or the material having low hardness can be used, and thereby, the optical surface property can be easily obtained. Accordingly, the process for producing the optical waveguide is very simple and low-cost, and the optical waveguide can be easily produced at low cost on various substrates. Since the shape of the polymer optical waveguide formed can be freely set, the waveguide can be formed on the irregularity side of the electronic device, and can be formed on the electric circuit such as a silicon wafer. In addition, the process of the invention has an extreme highly accurate shape reproducibility and a small wave guiding loss though the producing process is simple. Even if the flexible film substrate is used as the substrate having the cladding layer, the polymer optical waveguide which can be freely loaded to various equipments is obtained.

What is claimed is:

1. A process for producing a polymer optical waveguide comprising:
    1) preparing a rubber mold by
        bringing a rigid substrate, having a rubber layer-forming concave portion, into close contact with a core master template, wherein the core master template comprises a convex portion;
        filling a rubber-mold forming curable resin between the rigid substrate, with which the core master template has been brought into close contact, and the core master template, wherein
        the rubber mold has a composite layer structure wherein a rubber layer which has a concave portion corresponding to an optical waveguide core and comprises the rubber mold-forming curable resin is buried in the rubber layer-forming concave portion of the rigid substrate having the rubber layer-forming concave portion;
    2) bringing a cladding substrate into close contact with the rubber mold;
    3) filling the concave portion of the rubber mold, with which the cladding substrate has been brought into close contact, with a core-forming curable resin;
    4) curing the core-forming curable resin filled into the concave portion of the rubber mold;
    5) removing the rubber mold from the cladding substrate; and
    6) forming a cladding layer on the cladding substrate on which the core has been formed.

2. The process for producing the polymer optical waveguide of claim 1, wherein a groove part which has a shape that is approximately similar to that of the concave portion of the rubber layer and is 1 μm to 3 mm larger than a groove depth and a groove width of the concave portion of the rubber layer is contained in the rubber layer-forming concave portion of the rigid substrate, and a maximum thickness of the rigid substrate is in a range of 0.05 to 40 mm.

3. The process for producing the polymer optical waveguide of claim 1, wherein the core-forming curable resin is photo-curable, and the rigid substrate and the rubber layer comprise a material which transmits light of a wavelength that photo-cures the core-forming curable resin.

4. The process for producing the polymer optical waveguide of claim 3, wherein transmittance of the rigid substrate and the rubber layer with respect to the light having the wavelength that photo-cures the core-forming curable resin is 50%/mm or more.

5. The process for producing the polymer optical waveguide of claim 3, wherein transmittance of the rubber layer with respect to the light having the wavelength that photo-cures the core-forming curable resin is 50%/mm or more.

6. The process for producing the polymer optical waveguide of claim 1, wherein the rubber mold has a reinforced member which reinforces the rigid substrate, and an inlet for the core-forming curable resin is formed on the reinforced member.

7. The process for producing the polymer optical waveguide of claim 6, wherein the reinforced member comprises a metal material, a ceramic material, or a plastic material.

8. The process for producing the polymer optical waveguide of claim 1, wherein a layer of the core-forming curable resin has space formed therein for stress relaxation at a part communicated with an introducing part and/or an exhaust part at both ends of the concave portion.

9. The process for producing the polymer optical waveguide of claim 1, wherein the rubber mold-forming curable resin is a silicone-based rubber material.

10. The process for producing the polymer optical waveguide of claim 1, wherein the cladding layer is formed on an entire surface or part of the entire surface of the cladding substrate.

11. The process for producing the polymer optical waveguide of claim 1, wherein reduced-pressure suction is performed from an exhaust side on the core-forming curable resin of the concave portion of the rubber mold during the filling in process.

12. The process for producing the polymer optical waveguide of claim 11, wherein the reduced-pressure suction is performed at static pressure.

13. The process for producing the polymer optical waveguide of claim 11, wherein a reducing of pressure during the reduced-pressure suction is gradually changed and controlled.

14. The process for producing the polymer optical waveguide of claim 11, wherein pressurizing filling is performed from an injection side on the core-forming curable resin of the concave portion of the rubber mold simultaneously with the reduced-pressure suction.

15. The process for producing the polymer optical waveguide of claim 14, wherein the pressurizing filling and/or the reduced-pressure suction is performed at static pressure.

16. The process for producing the polymer optical waveguide of claim 14, wherein pressure during the pressurizing filling and/or a reducing of pressure during the reduced-pressure suction is gradually changed and controlled.

17. The process for producing the polymer optical waveguide of claim 1, wherein a maximum thickness of the rubber layer is in a range of 5 μm to 5 mm.

18. The process for producing the polymer optical waveguide of claim 1, wherein a Shore rubber hardness of the rubber mold-forming curable resin of the rubber mold is in a range of 10 to 45.

19. The process for producing the polymer optical waveguide of claim 1, wherein a surface energy of the rubber layer is in a range of 100 μN/cm to 350 μN/cm.

20. The process for producing the polymer optical waveguide of claim 1, wherein a surface roughness of a surface of the rubber layer coming into contact with the core-forming curable resin is 0.5 μm or less.

21. The process for producing the polymer optical waveguide of claim 1, wherein the cladding substrate is a ceramic-resin compound substrate, a film substrate, a ceramic substrate or a silicon wafer.

22. The process for producing the polymer optical waveguide of claim 1, wherein a viscosity of the core-forming curable resin before being cured is in a range of 50 mPa·s to 2000 mPa·s.

23. The process for producing the polymer optical waveguide of claim 1, wherein a difference between a refractive index of the cladding substrate and that of the core-forming curable resin is 0.01 or more.

* * * * *